United States Patent [19]

Guillaumon et al.

[11] Patent Number: 6,086,667
[45] Date of Patent: Jul. 11, 2000

[54] PIGMENTS COATED WITH ULTRAVIOLET RADIATION ABSORBENT

[75] Inventors: Jean-Claude Guillaumon, Ayguesvives; Pascale Véronique Nabarra, Baziege, both of France

[73] Assignee: Centre National d'Etudes Spatiales, Paris, France

[21] Appl. No.: 09/147,641

[22] PCT Filed: Nov. 4, 1997

[86] PCT No.: PCT/FR97/01973

§ 371 Date: Feb. 5, 1999

§ 102(e) Date: Feb. 5, 1999

[87] PCT Pub. No.: WO98/20080

PCT Pub. Date: May 14, 1998

[30] Foreign Application Priority Data

Nov. 5, 1996 [FR] France ................................. 96 13452

[51] Int. Cl.$^7$ ................... C09C 1/04; C09C 1/24; C09C 1/36
[52] U.S. Cl. .......................... 106/425; 106/245; 106/419; 106/420; 106/425; 106/430; 106/436; 106/441
[58] Field of Search ....................... 106/245, 419, 106/420, 425, 430, 436, 441

[56] References Cited

U.S. PATENT DOCUMENTS

| 3,607,338 | 9/1971 | Webb et al. | 106/292 |
| 4,460,665 | 7/1984 | Jacobson | 428/530 |
| 5,296,285 | 3/1994 | Babel et al. | 428/213 |

OTHER PUBLICATIONS

Chemical Abstracts, vol. 114, No. 4, Jan. 28, 1991, No. 26686a.

*Primary Examiner*—Karl Group
*Assistant Examiner*—Michael J. DiVerdi
*Attorney, Agent, or Firm*—Jacobson, Price, Holman & Stern, PLLC

[57] ABSTRACT

The invention relates, in particular, to pigments in the form of fine particles having enhanced stability with respect to ultraviolet solar radiation and particle radiation (electrons, protons), characterized in that the pigment are coated with a UV filter.

Application in the production of paints for spacecrafts.

10 Claims, No Drawings

PIGMENTS COATED WITH ULTRAVIOLET RADIATION ABSORBENT

The invention relates to pigments coated with an UV-absorbing agent, to a method for their preparation and to paints containing them.

A variety of techniques, in particular passive thermal control, are used for the thermal control of space vehicles.

Passive thermal control is based on the thermo-optical properties of the coatings applied to the space vehicles, that is to say:

the solar absorptivity ($a_s$) which is the following ratio:

$$a_s = \frac{\text{absorbed radiative solar flux}}{\text{incident radiative solar flux}}$$

This solar absorption coefficient is integrated over the solar spectrum between 0.2 and 2.8 µm.

the emissivity e, which is an energy radiation coefficient depending on the nature of the coatings.

By way of explanation, it is known that all bodies emit radiation proportional to the fourth power of their absolute temperature, to their surface area, to time and to the emissivity e.

The following equation therefore follows:

$$W = eS s T^4$$

where W: energy exchanged by radiation between the body in question and its surroundings, S: surface area (in cm$^2$)
T: temperature of the body (in K)
S$_0$: Stefan-Boltzmann constant=5.67×10$^{-8}$W/m$^2$.K$^4$ $$e = \frac{W}{S s_0 T^4}$$

Passive thermal control coatings can be divided into a variety of categories, among which particular distinction is made between the following, depending on the ratio $a_s/e$:

cold coatings ($a_s/e<1$) (for example: white paints, metallized plastic films, quartz mirrors, etc.)
hot coatings ($a_s/e>1$) (for example: black paints, gilding, polished metals, etc.).

White paints consist of a binder, at least one white pigment and a solvent.

The most commonly used white pigments are: titanium dioxide (TiO$_2$), zinc oxide (ZnO), zinc orthotitanate (Zn$_2$TiO$_4$), zinc orthostannate (Zn$_2$ SnO$_4$), tin orthotitanate (Sn TiO$_4$), etc. as well as mixtures of these pigments.

When white paints are exposed to a space environment, they suffer degradation, especially in their thermo-optical properties (increase in the solar absorption coefficient: $a_s$), under the combined action of the various factors involved in this space environment, principally by the effect of ultraviolet solar radiation and additionally by the effect of particle radiation (electrons, protons).

This solar radiation is distributed between 180 and 2800 nm, and short ultra-violet radiation (180 to 250 nm) is responsible for almost all the degradation.

One hypothesis which may be put forward to explain this degradation is as follows:

Under the action of UV radiation, the white pigments, essentially metal oxides MO$_x$, will lose oxygen to give a product MO$_{x-y}$ whose thermo-optical properties ($a_s$) are degraded.

The increase in the solar absorption coefficient $a_s$ is detrimental to passive thermal control and may be the origin of heating which can have serious consequences for the components of the space vehicle and/or the on-board equipment.

There is therefore a need for white pigments whose degradation, in particular under the effect of UV solar radiation, is reduced or eliminated.

Furthermore, coloured pigments consist of a binder, at least one colour pigment and a solvent.

The coloured pigments may be oxides of iron, lead, chromium, etc. or organic pigments, for example diazo compounds etc.

When coloured paint films are exposed to UV radiation, this leads to decolouration, especially for organic pigments.

There is therefore also a need for coloured pigments whose degradation, in particular under the effect of UV solar radiation, is reduced.

The object of the present invention is to meet these requirements, as well as others which will become apparent on reading the following description.

More particularly, the invention relates to pigments in the form of fine particles having enhanced stability with respect to solar ultraviolet radiation and particle radiation (electrons, protons), characterized in that the pigment particles are coated with a UV filter which absorbs ultraviolet radiation with a wavelength below 300 nm, but is transparent between the near infrared and the near ultraviolet (that is to say substantially between 2500 nm and 300 nm) and is selected from potassium bromide (KBr),
thallium bromide (TlBr),
rubidium iodide (RbI),
caesium bromide (CsBr),
caesium iodide (CsI),
rubidium bromide (RbBr),
rubidium chloride (RbCl),
potassium chloride (KCl), and
sodium chloride (NaCl).

The amount of UV filter applied to the pigment particles is not of critical importance. It will usually represent from 1 to 15% of the weight of the pigment.

The invention also relates to a method for improving the stability of pigments with respect to ultraviolet or particle radiation, characterized in that it consists in coating particles of a pigment with an aqueous solution, or a solution in a polar solvent, of at least one UV filter then in drying the said pigment particles so as to obtain pigment particles coated with the said UV filter which absorbs ultraviolet radiation with a wavelength below 300 nm, but is transparent between the near infrared and the near ultraviolet (that is to say substantially between 2500 nm and 300 nm) and is selected from potassium bromide (KBr),
thallium bromide (TlBr),
rubidium iodide (RbI),
caesium bromide (CsBr),
caesium iodide (CsI),
rubidium bromide (RbBr),
rubidium chloride (RbCl),
potassium chloride (KCl), and
sodium chloride (NaCl).

A coating method may, for example, consist in dissolving a UV filter in water, or in a polar solvent, at a suitable concentration, which may for example vary between 2% and 30% by weight depending on the UV filter. If need be, the mixture may be heated to improve dissolving. The pigment to be treated is added to the resulting solution, and the mixture is stirred for several hours in order to break up the particle aggregates which may be present. The pigment is allowed to settle, then is separated from the solution. After drying, final grinding may be carried out in order to break up the aggregates of particles possibly formed during the drying.

Other techniques of coating the particles with the UV filter are quite clearly possible, as will be obvious to the person skilled in the art. For example, a spraying technique could be used.

The coated white pigments according to the invention are, in particular, useful for the manufacture of white paints, in particular of the space type.

Particular examples of water-soluble UV filters which absorb UVs below 300 nm and can be used in the invention include:

potassium bromide (KBr),
thallium bromide (TlBr),
rubidium iodide (RbI),
caesium bromide (CsBr),
caesium iodide (CsI),
rubidium bromide (RbBr),
rubidium chloride (RbCl),
potassium chloride (KCl), and
sodium chloride (NaCl).

These UV filters are soluble in water or polar solvents, such as alcohols, for example methanol, ethanol, isopropanol, etc., and polyols, for example glycol etc.

At present, it is most particularly preferable to use caesium iodide. This may be applied, for example, in the form of an aqueous solution at a concentration of about 10%, in particular for white pigments.

The invention furthermore relates to a paint comprising at least one pigment, at least one film-forming binder, and optionally at least one solvent, characterized in that the pigment is a pigment according to the invention, and/or treated by the method of the invention.

The paints of the invention may be applied in one or more coats to the substrate to be painted, giving layers of paint with a thickness advantageously between 50 and 200 $\mu$m.

Any suitable binder may be used for forming the paints. By way of non-limiting examples, mention may be made of silicones, potassium or sodium silicate, polyurethanes, epoxy resins, acrylic resins, glycerophthalic resins, etc.

The person skilled in the art can find many types of useable binders in the wealth of literature published on this subject. For space applications, it is preferable to use silicone resins or potassium or sodium silicate as binders.

The treated pigment/binder weight ratio will usually be in the range from 2 to 12, although these values are not of highly critical importance.

By way of indication, solvents which may be used include aromatic hydrocarbons (toluene, xylene, naphtha, etc.), ketones (methyl ethyl ketone, methyl isobutyl ketone, diacetone alcohol, etc.), esters (ethylene glycol acetate, butylene glycol acetate, etc.), glycol ethers (ethyl glycol, butyl glycol, methylene glycol, propylene glycol, etc.), alcohols (ethanol, propanol, butanol, etc.) and water. The proportion of solvent will usually lie in the range from 0 to 60% by weight relative to the total weight of the paint. The value of 0% by weight corresponds to solventless paints.

The coats of paint containing the treated pigments of the invention may be applied to a substrate using a paint gun, a brush or any other known technique.

The paints of the invention may be applied to any kinds of substrates, such as metals, polymer films or composites. If desired, or necessary, an anchoring primer coat, or any other primer coat, may be applied before the paints of the invention are applied.

Further to its use on space vehicles or spacecrafts, the paints of the invention are useful in the aeronautical, automotive and building industries.

The following non-limiting examples are given with a view to illustrating the invention.

In the examples according to the invention, the pigment used was prepared by the following procedure: 200 g of the pigment to be treated was added to 400 ml of the aqueous solution of UV filter indicated in the examples, and the combined mixture was stirred for 4 hours. The pigment was allowed to settle, then was separated from the solution on a büchner funnel. The pigment was then dried in an oven at 100° C. for 16 hours. Final regrinding was carried out, where necessary, in the event that there were aggregates of pigment particles.

EXAMPLE 1 (Comparative)

In this example, and the following examples, the method for testing the paints of the invention is as follows: this accelerated test is intended to assess the resistance to the space environment, in particular to UV solar radiation, of coatings for thermal control of space vehicles. The samples of coatings to be tested are positioned on a sample holder which is kept at 40° C. throughout the trial and is placed in a vacuum chamber whose level is at around $5 \times 10^{-7}$ torr.

The exposure to ultraviolet radiation is carried out using a 4000 watt short-arc xenon source followed by double interference filtering delivering two ultraviolet bands. The exposure conditions are as follows:

200 to 300 nm band: around 1000 equivalent solar hours (esh) delivered with an acceleration factor close to 2.5, that is to say an incident power of the order of: $2.5 \times 1.62 = 4.05$ mW/cm$^2$;

300 to 400 nm band: around 1000 equivalent solar hours delivered with an acceleration factor close to 2.5, that is to say an incident power of the order of: $2.5 \times 10.2 = 25.5$ mW/cm$^2$.

It should be noted that the values of 1.62 and 10.2 mentioned above correspond to the U.V. solar radiation energy integrated between 200 and 300 nm, and between 300 and 400 nm, respectively.

The exposure to radiation is carried out continuously in the time intervals lying between the measurement points taken at 0.200 and 1000 esh.

The particle irradiation was estimated for various energies in order to best approximate the theoretical exposure profile calculated for the reference material on the geostationary orbit.

The exposure profiles are calculated over one year of geostationary orbiting for two proton energies and one electron energy which are adopted for this simulation.

During the trials, the irradiation was applied, separated by intermediate measurement points, while reproducing the exposure profile firstly at depth in the material then progressing towards the surface. The total exposure was carried out in accordance with the equivalent simulation length for the geostationary orbit represented by 1000 esh on the north and south faces of a three-axis stabilized satellite, that is to say 0.9 year.

Accordingly, the following were applied in order:

0.9×10$^{15}$ electrons per cm$^2$ with energy 400 keV 1.8×10$^{14}$ protons per cm$^2$ with energy 240 keV 1.8×10$^{15}$ protons per cm$^2$ with energy 45 keV.

The optical measurements made in situ consist in measuring the spectral reflectance (in the range 250 to 2400 nm) relative to a reference sample consisting of a thin layer of aluminium applied to a glass substrate by evaporation coating. The system used comprises a Perkin Elmer λ 9 spectrophotometer combined with an integrating sphere with lateral sample which can be evacuated.

These relative measurements are supplemented by absolute measurements taken at the start and end of the trial, in air, using a Cary 2300 spectrometer combined with an integrating sphere with central sample. The correspondence made at the trial start for each sample between the in situ relative spectrum in air and the absolute spectrum gives the corrective coefficients at each wavelength which are to be applied to all the subsequent in situ relative spectra.

Each reflection spectrum has an associated value of the solar reflectance calculated on the basis of the spectral values taken in the interval from 250 to 2400 nanometres.

The value of the solar reflectance ($\rho_s$) makes it possible to obtain the solar absorption coefficient ($\alpha_s$) through the equation: $\Delta_s = 1 - \rho_s$ for a sample of coating opaque to solar radiation.

The variations in solar reflectance, or in the solar absorption coefficient, during exposure to radiation, make it possible to monitor the degradation of the coatings under the action of the ultraviolet and particle radiation.

The paint in Example 1 contains untreated zinc orthotitanate pigment.

This example will be used as a reference and point of comparison in relation to paints made from pigments according to the invention.

A white coating, whose thickness after drying is close to 100 micrometres, is obtained by applying to a substrate a paint prepared by the following procedure: 21 g of toluene is added to 11.50 g of the Rhone-Poulenc silicone binder RTV 121, the mixture is stirred by hand, then 69 g of untreated orthotitanate ($Zn_2TiO_4$) is added to the solution obtained while stirring.

After this, the mixture is ground in a 250 ml glass flask with 100 g of glass beads in a Red Devil grinder for 30 minutes.

The composition obtained is separated from the beads by screening.

0.25 g of 10028 catalyst (Rhone-Poulenc) and 18 g of a diluent prepared from 47 parts by weight of toluene, 47 parts by weight of ethylene glycol diacetate and 6 parts by weight of ethylene glycol monoethylether are incorporated just before application of the paint.

The pigment/binder (P/B) ratio is 6.

After 1000 esh of exposure to ultraviolet radiation, the solar absorption factor ($\alpha s$) has been degraded by $\Delta\alpha s=0.08$ and $\Delta\alpha s=0.28$ for a simulation of 0.9 year in geostationary orbit.

EXAMPLE 2

A white coating is obtained whose thickness after drying is close to 100 micrometres, by applying to a substrate a paint whose composition is as follows:

RTV 121 silicone binder (11.5 g) and 10028 catalyst (0.25 g)

pigment: zinc orthotitanate having been treated in a 10% by weight solution of sodium chloride solvents: mixture of toluene, ester and ether from Example 1.

The P/B ratio is 6.

After 1000 esh of exposure to ultraviolet radiation, the solar absorption factor ($\alpha_s$) has been degraded by $\Delta\alpha s=0.041$ and $\Delta\alpha s=0.267$ for a simulation of 0.9 year in geostationary orbit.

EXAMPLE 3

A white coating is obtained whose thickness after drying is close to 100 micrometres, by applying to a substrate a paint whose composition is as follows:

RTV 121 silicone binder (11.5 g) and 10028 catalyst (0.25 g)

pigment: zinc orthotitanate having been treated in a 10% by weight solution of potassium bromide solvents: mixture of toluene, ester and ether from Example 1.

The P/B ratio is 6.

After 1000 esh of exposure to ultraviolet radiation, the solar absorption factor ($\alpha_s$) has been degraded by $\Delta\alpha s=0.042$ and $\Delta\alpha s=0.243$ for a simulation of 0.9 year in geostationary orbit.

EXAMPLE 4

A white coating is obtained whose thickness after drying is close to 100 micrometres, by applying to a substrate a paint whose composition is as follows:

RTV 121 silicone binder (11.5 g) and 10028 catalyst (0.25 g)

pigment: zinc orthotitanate having been treated in a 10% by weight solution of rubidium chloride solvents: mixture of toluene, ester and ether from Example 1.

The P/B ratio is 6.

After 1000 esh of exposure to ultraviolet radiation, the solar absorption factor ($\alpha_s$) has been degraded by $\Delta\alpha s=0.049$ and $\Delta\alpha s=0.251$ for a simulation of 0.9 year in geostationary orbit.

EXAMPLE 5

A white coating is obtained whose thickness after drying is close to 100 micrometres, by applying to a substrate a paint whose composition is as follows:

RTV 121 silicone binder (11.5 g) and 10028 catalyst (0.25 g)

pigment: zinc orthotitanate having been treated in a 10% by weight solution of caesium iodide solvents: mixture of toluene, ester and ether from Example 1.

The P/B ratio is 6.

After 1000 esh of exposure to ultraviolet radiation, the solar absorption factor ($\alpha_s$) has been degraded by $\Delta\alpha s=0.060$ and $\Delta\alpha s=0.265$ for a simulation of 0.9 year in geostationary orbit.

EXAMPLE 6

A white coating is obtained whose thickness after drying is close to 100 micrometres, by applying to a substrate a paint whose composition is as follows:

RTV 121 silicone binder (11.5 g) and 10028 catalyst (0.25 g)

pigment: zinc orthotitanate having been treated in a 10% by weight solution of caesium iodide solvents: mixture of toluene, ester and ether from Example 1.

The P/B ratio is 6.

After 1000 esh of exposure to ultraviolet radiation, the solar absorption factor ($\alpha_s$) has been degraded by $\Delta\alpha s=0.047$ and $\Delta\alpha s=0.156$ for a simulation of 0.9 year in geostationary orbit.

It is clear that the embodiments which have been described are no more than examples, and that they could modified, in particular by substitution of technical equivalents, without thereby departing from the scope of the invention.

What is claimed is:

1. Pigments in the form of fine particles having enhanced stability with respect to solar ultraviolet radiation and particle radiation which are coated with a UV filter which absorbs ultraviolet radiation with a wavelength below 300 nm, but is transparent between the near infrared and the near ultraviolet substantially between 2500 nm and 300 nm and is selected from the group consisting of potassium bromide (KBr)

thallium bromide (TlBr)

rubidium iodide (RbI)

caesium bromide (CsBr)

caesium iodide (CsI)

rubidium bromide (RbBr)

rubidium chloride (RbCl)

potassium chloride (KCl), and sodium chloride (NaCl).

2. Pigments according to claim 1, wherein the UV filter is caesium iodide.

3. Pigments according to claim 1, wherein the amount of UV filter represents from 1 to 15% of the weight of the pigment.

4. Method for improving the stability of pigments with respect to ultraviolet or particle radiation, which comprises coating particles of a pigment with an aqueous solution, or a solution in a polar solvent, of at least one UV filter then drying said pigment particles so as to obtain pigment particles coated with said UV filter, said UV filter absorbing ultraviolet radiation having a wavelength below 300 nm, but is transparent between the near infrared and the near ultraviolet substantially between 2500 nm and 300 nm and is selected from the group consisting of potassium bromide (KBr), thallium bromide (TlBr), rubidium iodide (RbI), caesium bromide (CsBr), caesium iodide (CsI), rubidium bromide (RbBr), rubidium chloride (RbCl), potassium chloride (KCl), and sodium chloride (NaCl).

5. Method according to claim 4, wherein said UV filter is caesium iodide.

6. Method according to claim 4, wherein the amount of UV filter represents from 1 to 15% of the weight of the pigment.

7. Method according to claim 4, which comprises an additional operation consisting in grinding the pigment after drying.

8. Paint comprising at least one pigment, at least one film-forming binder, and optionally at least one solvent, wherein said pigment is a pigment as defined in claim 1.

9. Paint according to claim 8, which is white in color and comprises a pigment selected from the group consisting of titanium dioxide ($TiO_2$), zinc oxide (ZnO), zinc orthotitanate ($Zn_2TiO_4$), zinc orthostannate ($Zn_2SnO_4$), tin orthotitanate ($SnTiO_4$), and mixtures thereof.

10. Paint comprising at least one pigment, at least one film-forming binder, and optionally at least one solvent, wherein said pigment is a pigment treated by a method as defined in claim 4.

* * * * *